(12) United States Patent
Edpalm et al.

(10) Patent No.: US 11,076,156 B2
(45) Date of Patent: Jul. 27, 2021

(54) POSTMASKING WITHOUT TRANSCODING

(71) Applicant: Axis AB, Lund (SE)

(72) Inventors: Viktor Edpalm, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/947,648

(22) Filed: Aug. 11, 2020

(65) Prior Publication Data

US 2021/0092387 A1     Mar. 25, 2021

(30) Foreign Application Priority Data

Sep. 20, 2019    (EP) ..................................... 19198671

(51) Int. Cl.
| | |
|---|---|
| *H04N 19/132* | (2014.01) |
| *H04N 19/176* | (2014.01) |
| *H04N 19/46* | (2014.01) |
| *G06K 9/00* | (2006.01) |
| *G06T 5/00* | (2006.01) |
| *H04N 7/18* | (2006.01) |

(52) U.S. Cl.
CPC ....... *H04N 19/132* (2014.11); *G06K 9/00744* (2013.01); *G06T 5/002* (2013.01); *H04N 7/183* (2013.01); *H04N 19/176* (2014.11); *H04N 19/46* (2014.11); *G06T 2207/10016* (2013.01); *G06T 2207/20104* (2013.01); *G06T 2207/30232* (2013.01)

(58) Field of Classification Search
CPC .... H04N 19/132; H04N 19/176; H04N 19/46; H04N 7/183; G06K 9/00744; G06T 2207/10016; G06T 2207/20104; G06T 2207/30232; G06T 5/002

USPC .......................................................... 348/158
See application file for complete search history.

(56) References Cited

U.S. PATENT DOCUMENTS

| | | |
|---|---|---|
| 8,098,904 B2 | 1/2012 | Ioffe et al. |
| 9,805,287 B2 | 10/2017 | Edpalm et al. |
| (Continued) | | |

FOREIGN PATENT DOCUMENTS

| | | |
|---|---|---|
| EP | 2874396 A1 | 5/2015 |
| EP | 3474548 A1 | 4/2019 |

OTHER PUBLICATIONS

European Search Report; European Patent Office. Application No. EP19198671.0; Place of Search: Munich; Date of Completion of the Search: Feb. 27, 2020. pp. 1-10.

(Continued)

*Primary Examiner* — Allen C Wong
(74) *Attorney, Agent, or Firm* — Mollborn Patents, Inc.; Fredrik Mollborn

(57) ABSTRACT

Methods and apparatus, including computer program products, implementing and using techniques providing privacy masks on a video stream. In a video received from a monitoring camera, at least one image region is selected, to which region a privacy mask should be applied. For any image frame in the video that contains the at least one image region, a flag is set to indicate a non-displayed image frame. A forward-predicted image frame referencing the non-displayed image frame is inserted, wherein coding units representing the at least one image region in the forward-predicted image frame collectively provide the privacy mask by obfuscating the at least one image region.

11 Claims, 2 Drawing Sheets

(56) References Cited

U.S. PATENT DOCUMENTS

| | | |
|---|---|---|
| 2005/0213760 A1 | 9/2005 | Lecomte et al. |
| 2017/0094217 A1* | 3/2017 | Lorenzetti ................ H04N 5/77 |
| 2017/0300757 A1 | 10/2017 | Wolf |
| 2018/0098077 A1 | 4/2018 | Skupin et al. |
| 2018/0101723 A1 | 4/2018 | Wakako et al. |
| 2018/0225476 A1* | 8/2018 | Siracusano, Jr. .. G06K 9/00771 |
| 2019/0116382 A1 | 4/2019 | Edpalm et al. |
| 2019/0191105 A1 | 6/2019 | Yuan et al. |
| 2020/0007883 A1* | 1/2020 | Toresson .............. H04N 19/107 |

OTHER PUBLICATIONS

Sang Gu Kwon et al: "Digital Video Scrambling Using Motion Vector and Slice Relocation", Jan. 1, 2005 (Jan. 1, 2005 ), Imageanalysis and Recognition Lecture Notes in Computer Science;LNCS, Springer, Berlin, DE, pp. 207-214, XP019020136, ISBN: 978-3-540-29069-8.

Zhang Xing et al: "A Lightweight Encryption Method for Privacy Protection in Surveillance Videos", IEEE Access, vol. 6, Apr. 2, 2018 (Apr. 2, 2018), pp. 18074-18087, XP011681671, DOI: 10.1109/ACCESS.2018.2820724.

* cited by examiner

POSTMASKING WITHOUT TRANSCODING

TECHNICAL FIELD

The present invention relates to the field of video encoding. In particular, it relates to a method and system for providing privacy masking on a video stream captured by a video camera.

BACKGROUND

Video cameras are used in many different applications, both indoors and outdoors, for monitoring a variety of environments. Images depicting a captured scene may be monitored by, e.g., an operator or a guard. In certain situations, there may be a need to treat one part of a captured image differently from another part, such as when there is a need to exclude part of an image, for example, in the interest of personal integrity. For example, in the case of body worn cameras (BWCs), such as those worn by law enforcement officers, it may be desirable to conceal faces, license plates, etc., in a scene recorded by the BWC.

In such instances, one or more privacy masks may be applied to those areas of the image. Typically, privacy masks are often applied to the image as an overlay. Some privacy masks take the form of an opaque area (e.g. a uniformly black area), while other privacy masks take the form of pixilation, where the image inside the privacy mask is divided into pixilation blocks and all pixels within a pixilation block are given the same value, often an average value of several or all the pixels within a pixilation block. Both of these approaches, however, causes the image to appear "blocky" inside the privacy mask area, which is not very pleasing from aesthetic point of view. There are other types of privacy masks, for example, blurring privacy masks, which would be more favorable from an aesthetic point of view. However, these techniques currently demand too much power to be implemented on certain devices, such as BWCs. Thus, there is a need for improved privacy masking techniques.

SUMMARY

In view of the above, it is thus an object of the present invention to overcome or at least mitigate the problems discussed above. In particular, it is an object of the present invention to provide techniques for providing privacy masks on a video stream, which will not require transcoding the video stream. This and other objects are achieved by a method according to claim 1, an encoder system according to claim 9, a computer program product according to claim 10, and a digital storage medium according to claim 11.

According to a first aspect, this and other objects are achieved, in full or at least in part, by a method, in a computer system, for providing privacy masks on a video stream. The method includes:
 in a video received from a monitoring camera, selecting at least one image region in the video to which region a privacy mask should be applied; and
 for any image frame in the video that contains the at least one image region:
  setting a flag for the image frame to indicate a non-displayed image frame; and
  inserting a forward-predicted image frame referencing the non-displayed image frame, wherein coding units representing the at least one image region in the forward-predicted image frame collectively provide the privacy mask by obfuscating the at least one image region.

This method provides a very convenient solution for post masking that does not require transcoding the video. Such a solution is particularly useful for BWCs, where it may be necessary, for example, to blur all faces (or license plates, etc.) for GDPR (General Data Protection Regulation) or similar reasons.

In addition, this method provides a reversible process, such that "unmasking" of the privacy masked portions of the image can later be performed, in the event that it were to be necessary. This can be, for example, for legal reasons or there may be situations in which some people are only allowed to see a privacy masked version of the video whereas other people should have access to an unmasked version of the video.

Another benefit is that the privacy masking can be done in a main unit, rather than on the camera itself, which reduces the complexity of the camera and makes this technique particularly useful for BWCs or other cameras that may need to be small or less complex for various reasons.

Using this method also avoids costly transcoding of the video. Avoiding transcoding also has the advantage of easier being able to prove that the video was actually captured and encoded at a specific camera, which may be important especially in the case of easily portable cameras, such as BWCs, and where the captured video may subsequently be used for evidentiary purposes in a legal context.

According to one embodiment, coding units representing areas outside the at least one image region in the forward-predicted image frame are set as skip blocks. A skip block is an inter-mode coded block of pixels, which refers to a corresponding block of pixels in a reference frame, from which corresponding block the image content should be completely copied. Using skip blocks therefore allows any unmasked areas to remain exactly the same as in the original image. In addition, encoding a skip blocks requires very little data, so it provides for an efficient way to code an image.

According to one embodiment, selecting at least one image region is done by a user. This allows an accurate and precise selection of which objects should be masked. For example, there may be situations in which only some individuals' faces should be masked while others should be visible. Having a person make such selections may be more efficient compared to having an image algorithm making them According to one embodiment, selecting the at least one image region is done automatically, using object detection techniques. This may provide an efficient way of selecting large numbers of objects that are easy to identify, such as all license plates of a large number of cars in a parking lot, or any individuals wearing red jackets in an image, etc. In certain embodiments automatic selections can be made by object detection techniques, and then be verified by a human operator, as described above, which might allow beneficial synergy effects.

According to one embodiment, the coding units representing the at least one image region in the forward-predicted image frame are arranged to provide obfuscation by introducing artificial motion vectors for the coding units, thereby causing blurring of the at least one image region. Using motion vectors is simple to implement and allows for various patterns and degrees of moving to be configured, thereby achieving different degrees of blurring.

According to one embodiment, the coding units representing the at least one image region in the forward-predicted image frame are arranged to provide obfuscation by replacing the coding units in the at least one image region. This has the effect of completely "wiping out" the object that is being masked, rather than blurring it, which may be useful in certain circumstances where a "wipe out" effect rather than a "blurring" effect is desired.

According to one embodiment, the coding units representing the at least one image region in the forward-predicted image frame are arranged to provide obfuscation by replacing the coding units with intrablocks with selected blurring of image data retrieved from the non-displayed image frame, thereby causing blurring of the at least one image region. This is yet another alternative to blurring and can be used where it is desired to completely replace the masked objects with something else, such as, company logos, smiley faces, cartoon characters, or whatever the case may be depending on the particular set of circumstances at hand.

According to one embodiment, the monitoring camera is a body worn camera (BWC). Using this method is particularly useful for smaller cameras, such as BWCs that have limited computing power, and where there may be special privacy concerns, either for law enforcement reasons, or a subsequent need to "unmask" certain areas of the recorded video.

According to one embodiment, the video can be encoded in one of the following formats: High Efficiency Video Coding, Versatile Video Coding, Essential Video Coding, VP9, and AV1. That is, the methods in accordance with the invention can be applied to a range of standard encoding formats, and do therefore not need any special custom equipment for decoding.

According to a second aspect, the invention relates to an encoder system for providing privacy masks on a video stream. The encoder system includes a docking station and an encoder. The docking station is configured to receive a video from a monitoring camera. The encoder is configured to:
  select at least one image region in the video to which region a privacy mask should be applied; and
  for any image frame in the video that contains the at least one image region:
    set a flag for the image frame to indicate a non-displayed image frame, and
    insert a forward-predicted image frame referencing the non-displayed image frame, wherein coding units representing the at least one image region in the forward-predicted image frame collectively provide the privacy mask by obfuscating the at least one image region.

According to a third aspect, the invention relates to a computer program for providing privacy masks on a video stream. The computer program contains instructions corresponding to the steps of:
  in a video received from a monitoring camera, selecting at least one image region in the video to which region a privacy mask should be applied; and
  for any image frame in the video that contains the at least one image region:
    setting a flag for the image frame to indicate a non-displayed image frame; and
    inserting a forward-predicted image frame referencing the non-displayed image frame, wherein coding units representing the at least one image region in the forward-predicted image frame collectively provide the privacy mask by obfuscating the at least one image region.

According to a fourth aspect the invention relates to a digital storage medium for storing such a computer program.

The second, third and fourth aspects may generally have the same features and advantages as the first aspect. It is further noted that the invention relates to all possible combinations of features unless explicitly stated otherwise.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements.

Like reference symbols in the various drawings indicate like elements.

DETAILED DESCRIPTION

Figure 1:
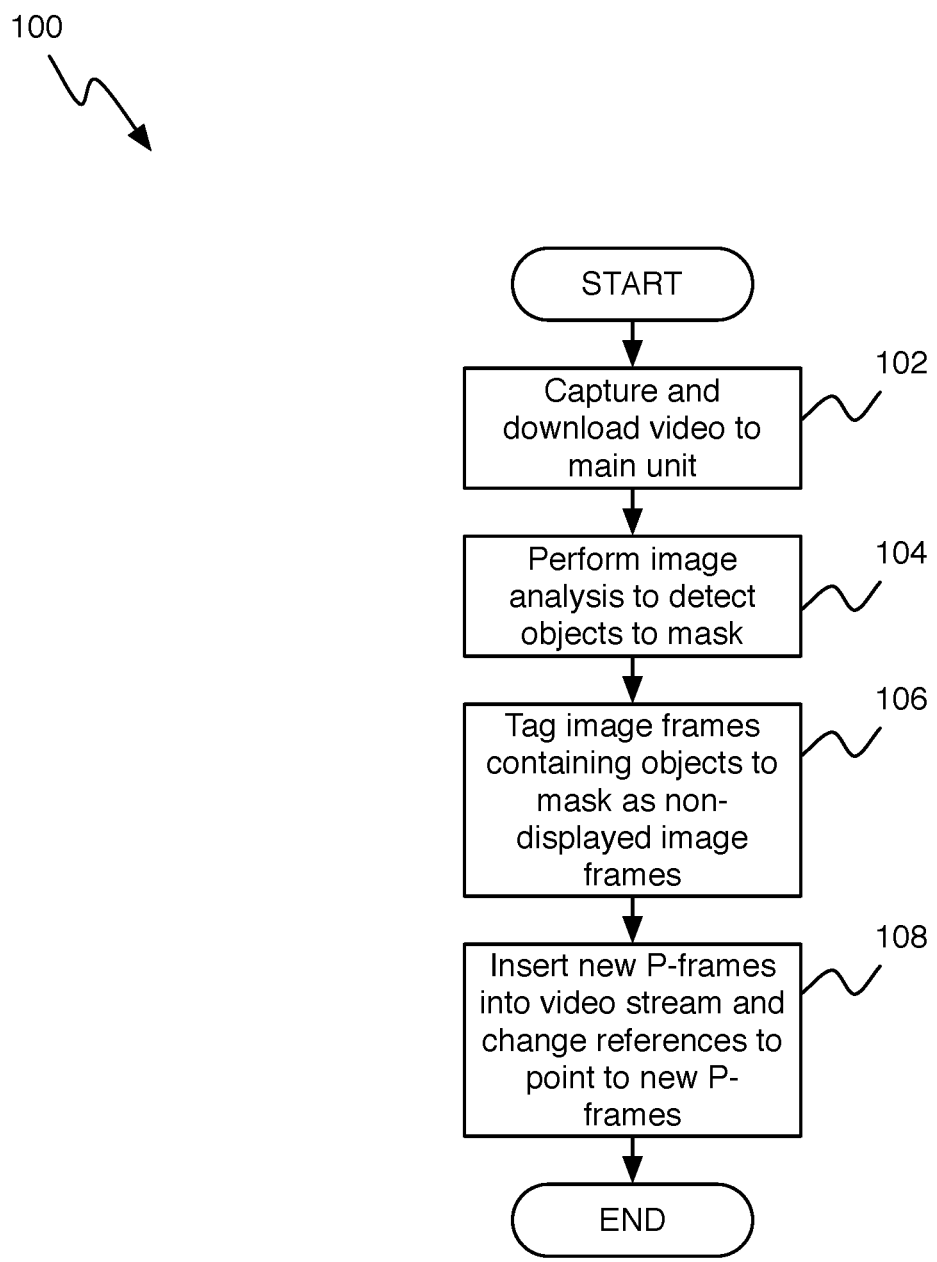
FIG. 1 shows a flowchart of a method 100 for providing a privacy mask on a video stream, in accordance with one embodiment.

The present invention will now be described more fully hereinafter with reference to the accompanying drawings, in which embodiments of the invention are shown. The systems and devices disclosed herein will be described during operation.

The various embodiments of the invention pertain to techniques for providing privacy masks on a video stream. The following is an example of a practical implementation that is provided in order to give the reader a better understanding of the general gist of the invention. Further implementation details of different embodiments will follow.

In this usage example, assume that a BWC captures video and is subsequently placed in a docking station, which downloads the BWC video to a main unit. The main unit decodes the video and performs analytics to find image areas corresponding to objects, that need to be masked. What types of objects should be masked is determined, e.g., based on the particular use case at hand, but typically, such objects might include faces, license plates, and other identifying information.

I-frames containing such objects are changed to non-displayed, for example, by changing headers of the frames, setting flags for the frames in order to tag the frames as being non-display, etc. New P-frames are then inserted, which refer to the non-displayed I-frames. The new P-frames have skip blocks everywhere, except in the areas to be masked (e.g., the face regions). In other words, when viewing the video, such a new P-frame will show an image identical to what the non-displayed, referenced I-frame would have shown, except for within the areas that are to be masked.

For the areas that are to be masked, there are some different options available. One alternative is to use motion vectors to obfuscate the face. The pattern and degree of motion can be configurable to achieve different levels of blurring. An advantage of this approach is that it is simple to implement and requires very little overhead. Another alternative is to insert I-blocks with selected blurring of the areas to be masked. In yet another alternative, I-blocks containing some kind of completely different image info can be inserted. Thus, there are many variations that can be used, and they all provide a privacy mask that is more aesthetically pleasing compared to what is currently available through opaque or pixilated privacy masks. Various embodiments will now be described in further detail. However, first, a brief overview of conventional video coding will be described to provide a general context of the implementation of the various embodiments and to explain the concepts of I-frames and P-frames.

In many digital video encoding systems, two main modes are used for temporal compression of a sequence of video frames: intra mode and inter mode. In the intra mode, the luminance and chrominance channels (or in some cases RGB or Bayer data) are encoded by exploiting the spatial redundancy of the pixels in a given channel of a single frame via prediction, transform, and entropy coding. The encoded frames are called intra-frames (also referred to as "I-frames"). An intra-frame is basically an image frame that is encoded using only the information in the image frame to be encoded. Within an I-frame, blocks of pixels, also referred to as I-blocks, macro blocks, coding units or coding tree units, are encoded in intra-mode, that is, they are encoded with reference to a similar block within the same image frame, or raw coded with no reference at all. As the intra-frame is calculated from all image data captured for the image frame to be encoded, it is sometimes also referred to as a full frame.

In contrast, the inter mode exploits the temporal redundancy between separate frames, and relies on a motion-compensation prediction technique that predicts parts of a frame from one or more previous frames by encoding the motion in pixels from one frame to another for selected blocks of pixels. The encoded frames are referred to as inter-frames, differential frames, P-frames (forward-predicted frames), which can refer to previous frames in decoding order, or B-frames (bi-directionally predicted frames), which can refer to two or more previously decoded frames, and can have any arbitrary display order relationship of the frames used for the prediction. Within a P-frame, blocks of pixels may be encoded either in inter-mode, meaning that they are encoded with reference to a similar block in a previously decoded image, or in intra-mode, meaning that they are encoded with reference to a similar block within the same image frame, or raw-coded with no reference. Expressed differently, an inter-frame takes advantage of temporally redundant information in previous (and optionally later) image frames.

An encoder implementing this type of codecs (compression standards) typically generates an intraframe followed by a predetermined number of inter-frames and then a new intra-frame followed by the same number of inter-frames. A set of an intra-frame and a number of inter-frames is referred to as a group of pictures (GOP). Image frames do not necessarily have to be encoded and decoded in the same order as they are captured or displayed, although that is typically the case. The only inherent limitation is that a frame that serves as a reference frame must be decoded before other frames that use it as reference can be encoded. In surveillance or monitoring applications, encoding is generally done in real time, meaning that the most practical approach is to encode and decode the image frames in the same order as they are captured and displayed, as there will otherwise be undesired latency. The length of a sequence of an intra-frame followed by a number of inter-frames is often referred to as Group of Pictures length (GOP length). For some compression standards, e.g. H.265, the GOP-length can be adjusted during encoding.

FIG. 1 shows a flowchart of a method 100 for providing a privacy mask on a video stream, in accordance with one embodiment. As can be seen in FIG. 1, the method 100 starts by video being captured by a camera and downloaded to a main unit, for example, through some kind of docking station, step 102. This can be done using conventional cameras, such as BWCs, and conventional downloading techniques, which are well-known by those having ordinary skill in the art, and will therefore not be described in any detail here.

Next, image analysis is performed on the downloaded video stream to detect objects that are to be masked, step 104. As mentioned above, such objects may include, for example, faces, license plates, or other types of identifying information that should be concealed for privacy (or other) purposes. There are many known techniques for object detection in images, which can be applied in this context. Some include classical methods like Histogram of Oriented Gradients, Supporting Vector Machine, Local Binary Patterns. There are also neural network based methods like Mobilenet available. Other methods include foreground extraction with differentiated time duration.

It should also be noted that image analysis is just one way to determine areas to be masked. In some implementations, the areas may be determined (or adjusted) by a human operator of the camera surveillance system, although this is less common in a practical use scenario.

Typically, the areas to be masked are identified as a set of coding units in an I-frame, and these coding units are subsequently used when creating a new P-frame, as will be described below. As was mentioned above, there are many various ways of applying a privacy mask when creating the new P-frame. In one embodiment, motion vectors are used to obfuscate the objects that are to be masked. The pattern and degree of moving can be configurable in various embodiments in order to achieve different degrees of blurring. The motion vectors can be randomly generated, be adaptively determined based on the image content, or be generated according to a predefined pattern which has been proven to give a reasonable degree of scrambling of the image data within the area to be masked. An advantage with this approach is that is simple to implement and can be done essentially without any overhead.

In another embodiment, coding units can be inserted that have a selected amount blurring. This has the effect of completely "wiping out" the object that is being masked, rather than blurring it. These operations are typically performed by the main unit, such as the docker station to which the video from the BWC is downloaded and saved.

In yet another embodiment, the coding units representing the mask can be replaced with completely different image information. For example, the coding units can be replaced by a smiley face, flowers, or some other type of arbitrary image, using techniques that are similar to those described in the previous paragraphs. From a practical point of view, inserting motion vectors is the most cost-effective approach in terms of computing resources, and it is typically also the most aesthetically pleasing alternative, as the video will look like a "regular" video, with certain areas blurred out. The embodiments involving the insertion of code blocks and arbitrary images, are typically somewhat more expensive to implement in terms of computational resources, and may also provide a somewhat less aesthetically pleasing resulting image, so in a practical implementation the motion vector embodiment may be more likely to be used.

Next, the I-frame that contains objects to be masked is set to be a non-displayed frame, step 106. As is well known to those having ordinary skill in the art, within the H.265 encoding standard (and other newer encoding standards such as Google's VP10), for example, a frame can be tagged as "no-display", meaning that the frame is not to be displayed to the user. In H.265, for example, the tagging can be done by setting a pic_output_flag in the slice header to false, or setting the no_display flag in the SEI header to true.

Next, a new P-frame that contains the privacy mask is inserted into the video stream, step 108, and any existing P-frames in the GOP which previously referred to the I-frame are changed to refer to the newly inserted P-frame. That is, in the revised GOP all P-frames will therefore include the image with the mask applied. The areas outside the coding units that form the mask are typically coded as skip blocks with reference to the non-displayed I-frame. As is well known to those having ordinary skill in the art, a skip block is an inter-mode coded block of pixels, which refer to a corresponding block of pixels in a reference frame, from which corresponding block the image content should be completely copied. That is, except for the masked area, the content of the new P-frame is identical to that of the non-displayed I-frame. This ends the process 100. A significant benefit of using this technique is that the encoded video stream can be decoded by a standard video stream decoder that supports the video coding format used by the encoder since the above method follows the standard of such video coding format.

A further advantage is that since the image data of the I-frame is still included in the GOP, but tagged as a non-displayed frame, all the originally captured image data is included in the encoded video stream and can later be retrieved by a custom decoder if needed. In some embodiments, all the masked data can be retrieved by simply changing the flag for the I-frame so it is no longer set to a non-displayed frame. In other embodiments, only a subset of the masked data may be retrieved. Assume, for example, that an image contains 10 faces and only one of them should be unmasked. In such a situation, the newly inserted P-frame can instead be replaced with another P-frame in which the one face is unmasked and the other 9 faces remain masked.

Figure 2:
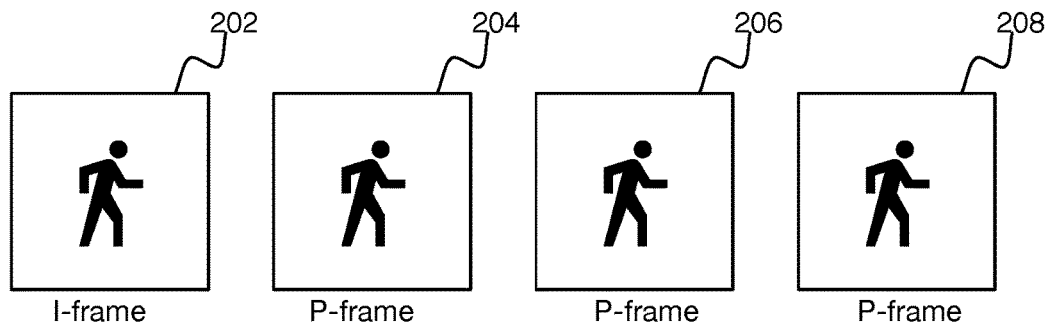
FIG. 2 shows a schematic view of a GOP prior to applying the method 100 of FIG. 1, in accordance with one embodiment.
Figure 3:
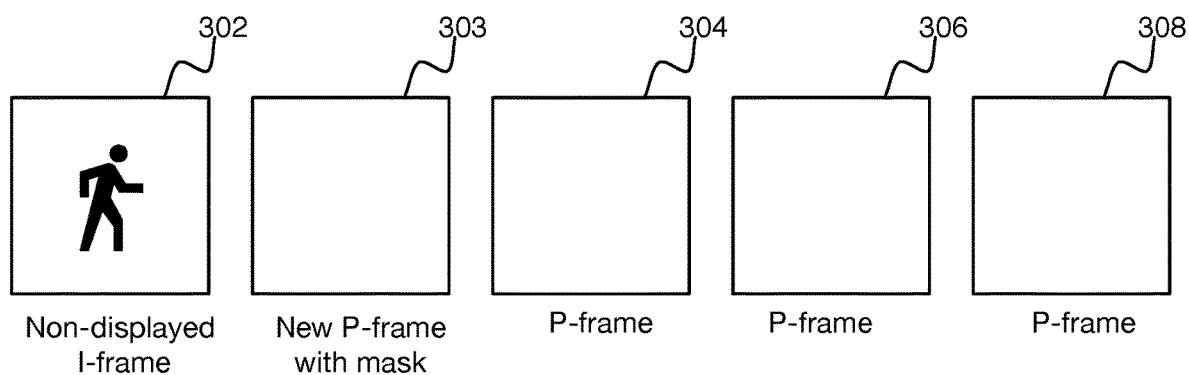
FIG. 3 shows a schematic view of a GOP after applying the method 100 of FIG. 1, in accordance with one embodiment.

FIGS. 2 and 3 provide a conceptual view of the methods in accordance with the various embodiments of the invention. As can be seen in FIG. 2, a GOP that is part of a video sequence captured by a camera includes an I-frame 202, followed by three P-frames, 204-208, all of which refer back to the I-frame 202. The I-frame includes a walking person, and the image processing determines that the walking person should be masked in the video for privacy reasons.

FIG. 3 shows the resulting modified GOP that is generated through applying the method 100 of FIG. 1. In the modified GOP, the I-frame 302 corresponds to the I-frame 202 of FIG. 2, but is now tagged as a non-displayed frame. A new P-frame 303 has been inserted, and in this P-frame the walking person masked so it is no longer visible. The remaining P-frames 304-308, which correspond to P-frames 204-208 of FIG. 2 now refer to the new P-frame 303, instead of the I-frame 302, and therefore the walking person is also masked in these frames. As can be seen, the size of the GOP (and thereby the video stream) will increase somewhat due to the addition of the new P-frame(s), but this increase in size is rather insignificant and should not have any major impact on the storage requirements for the video.

The various embodiments of the invention described herein can be used with any encoding scheme using a GOP structure with an intra-frame and subsequent inter-frames, e.g., High Efficiency Video Coding (HEVC/H.265), Versatile Video Coding (VVC), Essential Video Coding (EVC), VP9, and AV1, all of which are familiar to those having ordinary skill in the art.

The encoder is thus adapted to encode the video stream as described above. The encoder may be provided directly in video capturing device, or be connected to the video capturing device through a wired or wireless connection to receive the image data of the video stream. The encoder can include, or be connected to, a memory for retrieving precalculated motion vectors. The encoder can include a processing unit for calculating image transformations, and/or sample motion vectors from an image transformation. Alternatively, or additionally, the encoder can be adapted to receive image transformations and/or motion vectors from a separate calculation unit adapted to calculate or determine such image transformations and/or motion vectors.

The encoder typically includes one or several processing units (e.g. a CPU) for encoding the received image data as described above. The CPU can, for example, be adapted to run a software, installed from a computer-readable storage medium, with instructions adapted to carry out the encoding method of any of the above described embodiments when executed by the CPU. The encoder may further be adapted to transmit (e.g., via the Internet) the encoded video stream wireless or wired to a decoder adapted to decode the encoded video stream.

The systems (e.g., encoder) and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that a person skilled in the art can modify the above-described embodiments in many ways and still use the advantages of the invention as shown in the embodiments above. For example, the order of encoding the auxiliary frames and the frames complementing the auxiliary frames can be changed in any suitable way. For example, all auxiliary frames within a GOP may be encoded first, before including inter encoded frames referencing the auxiliary frames interlacing with the encoded auxiliary frames in the encoded video stream. Thus, the invention should not be limited to the shown embodiments but should only be defined by the appended claims. Additionally, as the skilled person understands, the shown embodiments may be combined.

The invention claimed is:

1. A method for providing privacy masks on a video stream, comprising:
   in a video received from a monitoring camera, selecting at least one image region in the video to which region a privacy mask should be applied,
   for an image frame in the video that contains the at least one image region:
      setting a flag for the image frame to indicate a non-displayed image frame; and
      inserting a forward-predicted image frame referencing the non-displayed image frame, wherein coding units representing the at least one image region are processed differently from coding units representing areas outside the at least one image region, such that coding units representing the at least one image region are obfuscated to collectively form the privacy mask and coding units representing areas outside the at least one image region are set as skip blocks; and
   outputting a video stream including both the non-displayed image frame and the forward-predicted image frame.

2. The method of claim 1, wherein selecting at least one image region is done by a user.

3. The method of claim 1, wherein selecting the at least one image region is done automatically, using object detection techniques.

4. The method of claim 1, wherein the coding units representing the at least one image region in the forward-predicted image frame are arranged to provide obfuscation by introducing artificial motion vectors for the coding units, thereby causing blurring of the at least one image region.

5. The method of claim 1, wherein the coding units representing the at least one image region in the forward-predicted image frame are arranged to provide obfuscation by replacing the coding units in the at least one image region.

6. The method of claim 1, wherein the coding units representing the at least one image region in the forward-predicted image frame are arranged to provide obfuscation by replacing the coding units with intrablocks with selected blurring of image data retrieved from the non-displayed image frame, thereby causing blurring of the at least one image region.

7. The method of claim 1, wherein the monitoring camera is a body worn camera.

8. The method of claim 1, wherein the video is encoded in one of the following formats: High Efficiency Video Coding, Versatile Video Coding, Essential Video Coding, VP9, and AV1.

9. An encoder system for providing privacy masks on a video stream, the encoder system comprising:
   a docking station configured to receive a video from a monitoring camera; and
   an encoder configured to:
      select at least one image region in the video to which region a privacy mask should be applied,
      for an image frame in the video that contains the at least one image region:
         set a flag for the image frame to indicate a non-displayed image frame, and
         insert a forward-predicted image frame referencing the non-displayed image frame, wherein coding units representing the at least one image region are processed differently from coding units representing areas outside the at least one image region, such that coding units representing the at least one image region are obfuscated to collectively form the privacy mask and coding units representing areas outside the at least one image region are set as skip blocks; and
      output a video stream including both the non-displayed image frame and the forward-predicted image frame.

10. A computer program, stored on a non-transitory computer-readable medium, for providing privacy masks on a video stream comprising program instructions corresponding to the steps of:
    in a video received from a monitoring camera, selecting at least one image region in the video to which region a privacy mask should be applied,
    for an image frame in the video that contains the at least one image region:
       setting a flag for the image frame to indicate a non-displayed image frame; and
       inserting a forward-predicted image frame referencing the non-displayed image frame, wherein coding units representing the at least one image region are processed differently from coding units representing areas outside the at least one image region, such that coding units representing the at least one image region are obfuscated to collectively form the privacy mask, and coding units representing areas outside the at least one image region are set as skip blocks; and
    outputting a video stream including both the non-displayed image frame and the forward-predicted image frame.

11. A non-transitory digital storage medium comprising a computer program as claimed in claim 10.

* * * * *